Aug. 10, 1965  H. E. McCULLOUGH  3,199,125
CORN PICKER ROLLS CLEANER
Filed July 11, 1961  2 Sheets-Sheet 1

Harry E. McCullough
INVENTOR.

BY *Clarence A. O'Brien*
*and Harvey B. Jacobson*
Attorneys

Aug. 10, 1965  H. E. McCULLOUGH  3,199,125
CORN PICKER ROLLS CLEANER
Filed July 11, 1961  2 Sheets-Sheet 2
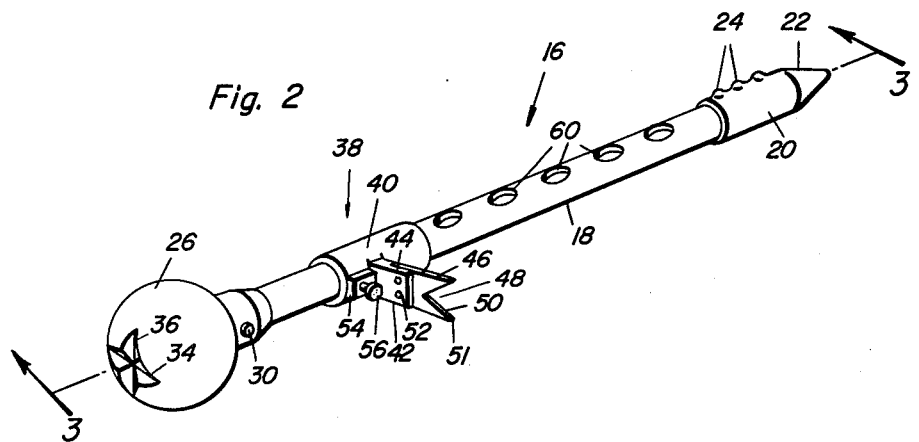
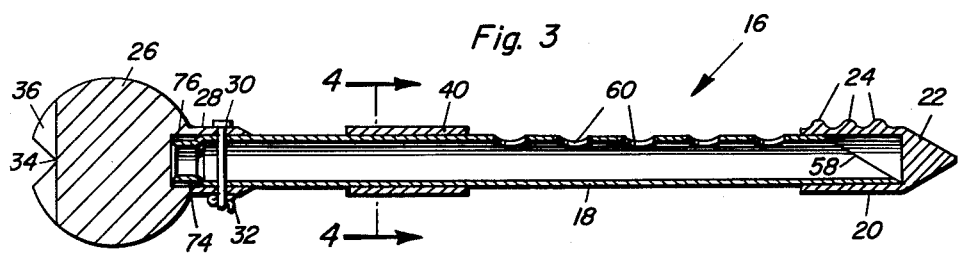
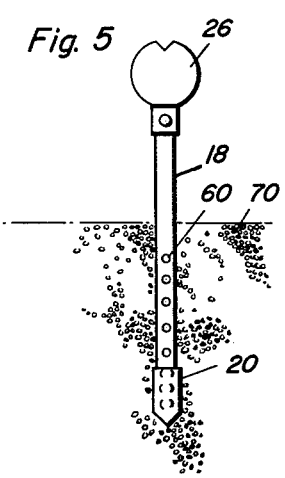
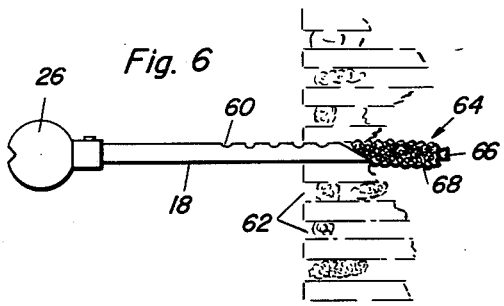
Harry E. McCullough
INVENTOR.

United States Patent Office 3,199,125
Patented Aug. 10, 1965

3,199,125
CORN PICKER ROLLS CLEANER
Harry E. McCullough, Rte. 1, Bridgeport, Ill.
Filed July 11, 1961, Ser. No. 123,286
4 Claims. (Cl. 7—14.1)

This invention relates to hand tools, and more particularly to a hand tool having multiple uses. Briefly, the tool is useful for cleaning the rolls of corn picker while the picker is in operation, for probing grain in a bin and taking samples thereof, for removing corn from cobs stored in bins and taking samples therof, and for taking samples of the soil from the earth in the form of a core.

In the past, when mechanical corn picker rolls became clogged with cornstalks, operators have been cleaning these rolls with their bare hands without bothering to shut down the picker. As a result, horrible accidents have occurred. Accordingly, a primary object of this invention is to provide a device for manually cleaning the clogged rolls of a corn picker while it is in operation without danger to the operator.

Another object of the invention is to provide a specially constructed device for use on the rolls of a corn picker while in operation, a device having an adequately long handle with a bulbous body on the end and two prongs that are sharpened on the inside edges to extract stalks that cannot be forced through the rolls with the body. The bulbous body at the end of the handle is of considerable importance inasmuch as the rolls of the corn picker cannot grasp it and pull it through them.

Another object of the invention is to provide a hand tool having a hollow handle which may be used for sampling grain stored in a bin.

It is still another object of the invention to provide a hand tool having an elongated hollow handle adapted to remove corn from a cob and simultaneously take samples of the corn removed.

Another object of the invention is to provide a hand tool having a bulbous body on one end thereof and a handle on the other end thereof, the bulbous body being removable thereby exposing an hollow end of the tool which is adapted to take earth samples in the form of cores.

It is still another object of my invention to provide a hand tool which may be conveniently carried and also used as a walking cane when not needed for other purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a perspective view of the corn picker rolls cleaner;

FIGURE 3 is an enlarged cross sectional vertical view taken substantially on the plane of line 3—3 in FIGURE 2;

FIGURE 5 is an elevational view on a reduced scale showing the invention being used for probing and taking samples of grain;

FIGURE 6 is a fragmentary elevational view showing the invention being used for removing grains of corn from a cob stored in a bin.

Figure 1:
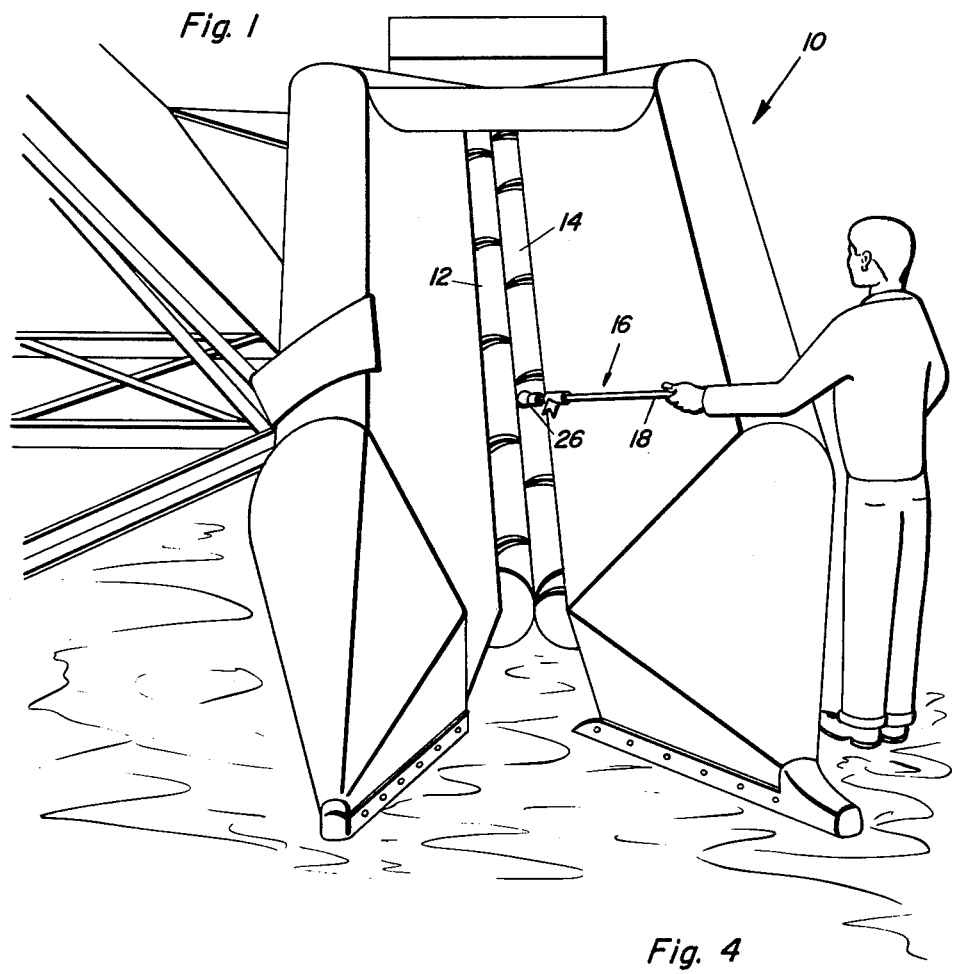
FIGURE 1 is a perspective view showing the invention being used to clean a conventional corn picker when in operation.

In the accompanying drawing there is shown the picking portion of a corn picker (see FIGURE 1). The picker 10 includes a pair of parallel side-by-side power driven rolls 12 and 14 that are used to strip ears of corn from corn stalks and deliver the ears to another part of the machine. The machine itself is conventional, and during operation thereof the rolls 12 and 14 often become jammed with stalks. In order to save time and energy, the operator of the picker will normally attempt to remove jammed material from between the rolls while the machine is still operating without bothering to cut off the power source or disconnect the rolls therefrom. This often results, as explained above, in bad accidents, since the operator occassionally gets a hand or foot caught in the operating mechanism of the picker. By using my cleaner 16, such accidents may be easily prevented.

Referring to the drawings, and particularly to FIGURES 2 and 3, it can be seen that the cleaner 16 comprises an elongated tubular handle 18 having a cylindrical handgrip telescoped on the upper end of the handle as shown at 20. The upper end of the handle 20 is conical as shown at 22, and fingergrips 24 are provided on one side of the handle for improving the grip obtainable thereon.

The lower end of the elongated handle 18 is secured to a bulbous spherical body 26 by means of a collar 28 integral with the body and telescopically receiving the lower end of the handle. An easy-out pin extends through aligned apertures in the sleeve 28 and handle for securing them together. One end of the pin has a conventional head, while the other end of the pin is apertured for receiving a conventional cotter key 32.

On the side of the body 26 opposite the sleeve 28, is formed two sets of grooves 34 and 36 which are perpendicular to one another. The grooves 34 and 36 are preferably V-shaped in cross section, or alternatively they may be arcuate or U-shaped in cross section.

A stalk cutting and removing device 38 is removably and adjustably mounted on the handle 18. The device 38 comprises a cylindrical sleeve 40 which snugly and slidably receives the handle 18 and having a radially projecting arm integral therewith. The arm 42 has a rectangular notch 44 which receives the inner end of a cutting and chopping blade 46. The blade 46 is substantially rectangular except for a V-shaped notch 48 formed in its outer edge. The edges 50 defining the notch 48 are extremely sharp and knife-like. The blade 46 is secured to arm 42 by means of rivets 52.

A lug 54 is formed integrally with sleeve 40 adjacent arm 42, has a radial threaded bore therein adjustably receiving a threaded bolt 56. The bolt 56 functions as a setscrew since it secures the sleeve 40 to handle 18 when screwed inwardly a sufficient distance.

In operation, as shown in FIGURE 1, the operator holds the cleaner 16 by means of the grip 20 and allows the bulb 26 to ride on the clevis formed between rolls 12 and 14. When a corn stalk becomes jammed between the rolls, the operator forces the bulb 26 against the stalk so that it is received in one of the grooves 34 or 36. By further pushing and shoving the stalk by means of the cleaner, it may be forced or dislodged from between the rolls. However, if the stalk cannot be dislodged in this manner, the operator may pierce the stalk with the points 51 of blade 46 and pull from it between the rolls. If the stalk still cannot be removed in this pulling manner, the operator may then chop it into small bits by swinging the cleaner like an axe and cut the stalk with the blades 50.

It is to be noted that the spherical shape of bulb or ball 26 allows it to ride freely on rolls 12 and 14 with a minimum of friction and without becoming stuck therebetween.

The handle 18 is hollow, and the upper end thereof is beveled as shown at 58. The upper beveled edge is sharpened for effective cutting. A row of circular apertures 60 are formed longitudinally along one side of the handle 18 between grip 20 and sleeve 40.

FIGURE 6 illustrates how the upper end of the handle 18 may be used for sampling corn stored in a bin. In order to sample the corn, the grip 24 is removed and the operator forces the sharpened edge 58 through one of the slots 62 and aligns the axis of the handle with an ear of corn 64. By pushing in on bulb 26, the knife-like beveled edge 58 shears the grain 68 from the cob 66. Some of the grain removed from the cob will be received in aperture 60 while the cob will extend into the extreme end of the handle 18. When the handle 18 is withdrawn from the bin, the grains of corn therein will be removed therewith. If the slots 62 are of sufficient size, the entire ear 64 may be pulled out of the bin by means of the handle.

FIGURE 5 illustrates a typical manner of using the invention for sampling other types of grain 70. For sampling the grain 70, it is not necessary to remove the grip 20. It is only necessary to force the conical end 22 of the handle into the grain. As the handle 18 moves through the grain, the grain trickles into the hollow interior of the handle by means of the aperture 60. After the grain is withdrawn, it may be removed more rapidly from the handle by slipping off grip 20 and allowing the grain to fall out of the end of the handle which normally receives the grip 20.

Figure 7:
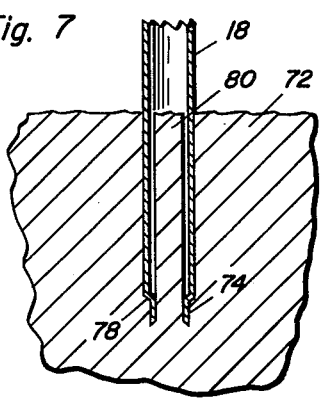
FIGURE 7 is a cross sectional vertical view as showing the invention being used for taking a sample of soil.
Figure 4:
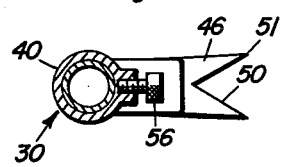
FIGURE 4 is a cross sectional view taken substantially on the plane of line 4—4 in FIGURE 3.

FIGURE 7 illustrates the manner of using the invention for taking samples of earth. For such use, it is only necessary to remove cotter pin 32, pin 30, and then slip off the ball 26. The operator then grabs the handle 18 by means of grip 20 and forces it downwardly into soil 72. It is to be noted that the lower end of the handle 18 is of reduced diameter as shown at 74. Reduced portion 74 has an annular cutting edge 76 which is quite sharp. The portion 74 is connected to the handle 18 by a portion 78 shaped as a truncated cone. By having the cutting portion 74 of reduced diameter, it can be seen that the core of soil 80 is of substantially smaller diameter than the inside of the handle 18, and thereby can be easily removed from the upper end of the handle.

It is also to be noted that the sleeve 40 may be removed from handle 18 merely by loosening setscrew 56 and sliding the sleeve longitudinally. This permits removal of the blade 46 for sharpening or replacement or when it is not needed.

It is to be noted that the hollow handle serves a plurality of purposes. For example, it permits the handle to be made relatively large whereby it may be effectively gripped without increasing its weight and it also functions as a grain chamber. The ports 60 not only function as grain conducting passages, but also serve as fingergrips when the tool is used for unclogging corn picker rolls and taking earth samples.

The pointed end 22 of hand grip 20 facilitates movement of handle 18 into grain as illustrated in FIGURE 5, and further, it prevents the grain from falling from the end of the handle when it is removed from the grain.

The ball 26 serves as a handgrip and pushing surface when the tool is used for sampling grain or soil.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hand tool for freeing the clogged rolls of a corn picker comprising an elongated equal diameter handle, an enlarged head at one end of the handle having a smooth outer surface adapted to ride on the rolls so that they will not grip the head and pull it through the rolls, a hand gripping portion adjacent the other extremity of the handle, and an extractor connected to the handle for cutting and pulling material lodged between the rolls, said extractor comprising a sharpened blade projecting from said handle between the enlarged head and the gripping portion and spaced rearwardly of the enlarged head, said blade being adjustably affixed to the handle and transversely orientated relative to the longitudinal axis of the handle.

2. A device as defined in claim 1 wherein said head is generally spherical in shape and has grooves in the forward face thereof adapted to receive portions of corn stalks.

3. A device as defined in claim 1 including a sleeve slidably mounted on said handle, said blade being rigidly fixed to said sleeve and thereby adjustably fixed to said handle, and means for fixing said sleeve in selected positions along said handle.

4. A device as defined in claim 1 wherein said blade includes a central notch therein, the edges defining said notch diverging outward from the handle and terminating in a pair of relatively sharp points.

References Cited by the Examiner

UNITED STATES PATENTS

| | | | |
|---|---|---|---|
| 396,611 | 1/89 | Scofield | 7—1 X |
| 618,469 | 1/99 | Knox | 7—14.1 |
| 1,436,095 | 12/22 | Clark | 7—14.1 |
| 1,499,501 | 7/24 | Boykin | 145—29 |
| 1,961,050 | 5/34 | Johnson | 254—25 |
| 2,907,106 | 10/49 | Lockwood | 7—14.1 X |
| 2,554,608 | 5/51 | Simmerly | 294—23.5 |
| 2,896,444 | 7/59 | Forman et al. | 73—425.2 |
| 3,118,226 | 1/64 | Balz | 30—168 |

FOREIGN PATENTS

| | | |
|---|---|---|
| 623,008 | 7/61 | Canada. |

References Cited by the Applicant

UNITED STATES PATENTS

| | | |
|---|---|---|
| 2,306,403 | 12/42 | Mortensen. |
| 2,361,402 | 10/44 | Jamieson. |
| 2,694,255 | 11/54 | Hancock. |
| 2,943,391 | 7/60 | Shannon. |

WILLIAM FELDMAN, *Primary Examiner.*